(12) United States Patent
Yan et al.

(10) Patent No.: US 11,416,286 B2
(45) Date of Patent: Aug. 16, 2022

(54) COMPUTING ON TRANSIENT RESOURCES

(71) Applicant: MICROSOFT TECHNOLOGY LICENSING, LLC, Redmond, WA (US)

(72) Inventors: Ying Yan, Beijing (CN); Yanjie Gao, Beijing (CN); Yang Chen, Beijing (CN); Thomas Moscibroda, Beijing (CN); Narayanan Ganapathy, Redmond, WA (US); Bole Chen, Pittsburgh, PA (US); Zhongxin Guo, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 235 days.

(21) Appl. No.: 16/450,811

(22) Filed: Jun. 24, 2019

(65) Prior Publication Data
US 2019/0310885 A1    Oct. 10, 2019

Related U.S. Application Data

(63) Continuation of application No. 15/406,290, filed on Jan. 13, 2017, now Pat. No. 10,331,479.

(51) Int. Cl.
*G06F 9/46* (2006.01)
*G06F 9/48* (2006.01)
(Continued)

(52) U.S. Cl.
CPC ........ *G06F 9/4881* (2013.01); *G06F 11/0757* (2013.01); *G06F 11/14* (2013.01);
(Continued)

(58) Field of Classification Search
None
See application file for complete search history.

(56) References Cited

U.S. PATENT DOCUMENTS 10,331,479 B2 * 6/2019 Yan ..................... G06F 11/1461
2003/0191795 A1 * 10/2003 Bernardin ............... G06F 9/505
718/105

(Continued)

OTHER PUBLICATIONS

Yang et al., "Reliable Computing Service in Massive-Scale Systems through Rapid Low-Cost Failover", IEEE Transactions on Services Computing, vol. 10, No. 6, Nov./Dec. 2017, pp. 969-983. (Year: 2017).*

*Primary Examiner* — Kenneth Tang
(74) *Attorney, Agent, or Firm* — Shook, Hardy & Bacon L.L.P.

(57) ABSTRACT

Aspects of the technology described herein can facilitate computing on transient resources. An exemplary computing device may use a task scheduler to access information of a computational task and instability information of a transient resource. Moreover, the task scheduler can schedule the computational task to use the transient resource based at least in part on the rate of data size reduction of the computational task. Further, a checkpointing scheduler in the exemplary computing device can determine a checkpointing plan for the computational task based at least in part on a recomputation cost associated with the instability information of the transient resource. Resultantly, the overall utilization rate of computing resources is improved by effectively utilizing transient resources.

20 Claims, 8 Drawing Sheets

(51) Int. Cl.
*G06F 11/14* (2006.01)
*G06F 11/07* (2006.01)

(52) U.S. Cl.
CPC ...... *G06F 11/1451* (2013.01); *G06F 11/1461* (2013.01); *G06F 2201/81* (2013.01)

(56) References Cited

U.S. PATENT DOCUMENTS

| | | | |
|---|---|---|---|
| 2010/0153945 A1* | 6/2010 | Bansal | G06F 9/4881 718/1 |
| 2012/0167101 A1* | 6/2012 | Kandula | G06F 9/5038 718/102 |
| 2014/0026147 A1* | 1/2014 | Cherkasova | G06F 9/505 718/105 |
| 2016/0006779 A1* | 1/2016 | Zhou | G06F 11/1438 709/231 |
| 2016/0098292 A1* | 4/2016 | Boutin | G06F 9/505 718/104 |
| 2018/0081722 A1* | 3/2018 | Kirchner | G06F 9/4881 |
| 2020/0183796 A1* | 6/2020 | Bishop | G06F 11/14 |
| 2021/0263779 A1* | 8/2021 | Haghighat | G06F 11/3419 |

\* cited by examiner

COMPUTING ON TRANSIENT RESOURCES

CROSS-REFERENCE TO RELATED APPLICATIONS

This application is a continuation of U.S. patent application Ser. No. 15/40,290 filed on Jan. 13, 2017, and titled "Computing on Transient Resources," the entire contents of which is incorporated herein by reference.

BACKGROUND

Large-scale networked systems are commonplace platforms employed in a variety of settings for running applications and maintaining data for business and operational functions. For instance, a data center (e.g., physical cloud computing platform) may provide a variety of services (e.g., web applications, email services, search engine services, etc.) for a plurality of customers simultaneously. These large-scale networked systems typically include many resources distributed throughout the data center or throughout multiple data centers in a region or multiple regions across the globe. Resources can resemble a physical machine or a virtual machine (VM) running on a physical node or host. The data center runs on hardware (e.g., power supplies, racks, and Network Interface Controllers (NIC)) and software components (Applications, Application Programming Interfaces (APIs), Databases) that rely on each other to operate.

Large-scale public cloud providers invest billions of dollars into their cloud infrastructure and operate hundreds of thousands of servers across the globe. New data centers are being built and expanded across the globe. However, even with the state-of-the-art cluster management and scheduling techniques, the average resource utilization in data centers is often low. Some reasons for this low resource utilization are common for many data centers, such as some capacity is required as buffers to handle the consequences of failures; natural demand fluctuation causes capacity to be unused at certain times; servers are over-provisioned to handle load-spikes; fragmentation at the node and cluster level prevents all machines from being fully utilized; churn induces empty capacity; and so forth.

Unutilized computing resources that can be used at least temporarily at a computing platform may be referred to as transient resources. Running latency-insensitive jobs en masse on transient resources could be a key to increase resource utilization. However, traditional distributed data processing systems such as Hadoop or Spark (Apache Spark™ is an open source cluster computing framework) are designed to run on dedicated hardware, and they perform badly on transient resources because of the excessive cost of cascading recomputations typically required after the transient resources fail or become unavailable.

SUMMARY

In various embodiments, systems, methods, and computer-readable storage devices are provided for facilitating higher utilization of transient resources in a computing platform. Scheduling is a process of matching or assigning a transient resource to a task. Checkpointing is a process of saving a data block that needs to be consumed by an uncompleted task to a local or remote storage location. Resource instability information can refer to the inconstant or variable availability of transient resources, e.g., manifested as a probability distribution of the lifetime of a transient resource in a session. Resource instability information can also be conversely referred to as resource stability information in this disclosure. A rate of data size reduction can reflect the rate of change between the input data and output data of a task. The rate of data size reduction may be interchangeably referred to as the data size reduction rate in this disclosure.

The technology in this disclosure for computing on transient resources includes several aspects, such as scheduling technologies based on resource instability information and data size reduction information of tasks, and checkpointing technologies based on resource stability information and task dependency information.

One aspect of the technology described herein is to schedule a computational task to use a transient resource based at least in part on the rate of data size reduction of the computational task. Another aspect of the technology described herein is to determine a checkpointing plan for the computational task based at least in part on a recomputation cost associated with the instability information of the transient resource. Resultantly, the overall utilization rate of computing resources is improved by effectively utilizing transient resources, e.g., for large-scale data processing.

In one embodiment, the technologies disclosed herein can be implemented into a transient resource Spark system (referred to as TR-Spark hereinafter). While traditional Spark systems are often unable to complete a task within a reasonable amount of time on transient resources, even with moderate instability issues, TR-Spark can naturally adapt to the stability characteristics of the underlying computing infrastructure and complete all jobs within a near-optimal execution time. Computing jobs, which are generally expensive but not latency critical, such as big data analytics jobs, become suitable candidates to take advantage of TR-Spark, as such jobs can be executed highly efficiently as secondary background tasks on transient resources.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
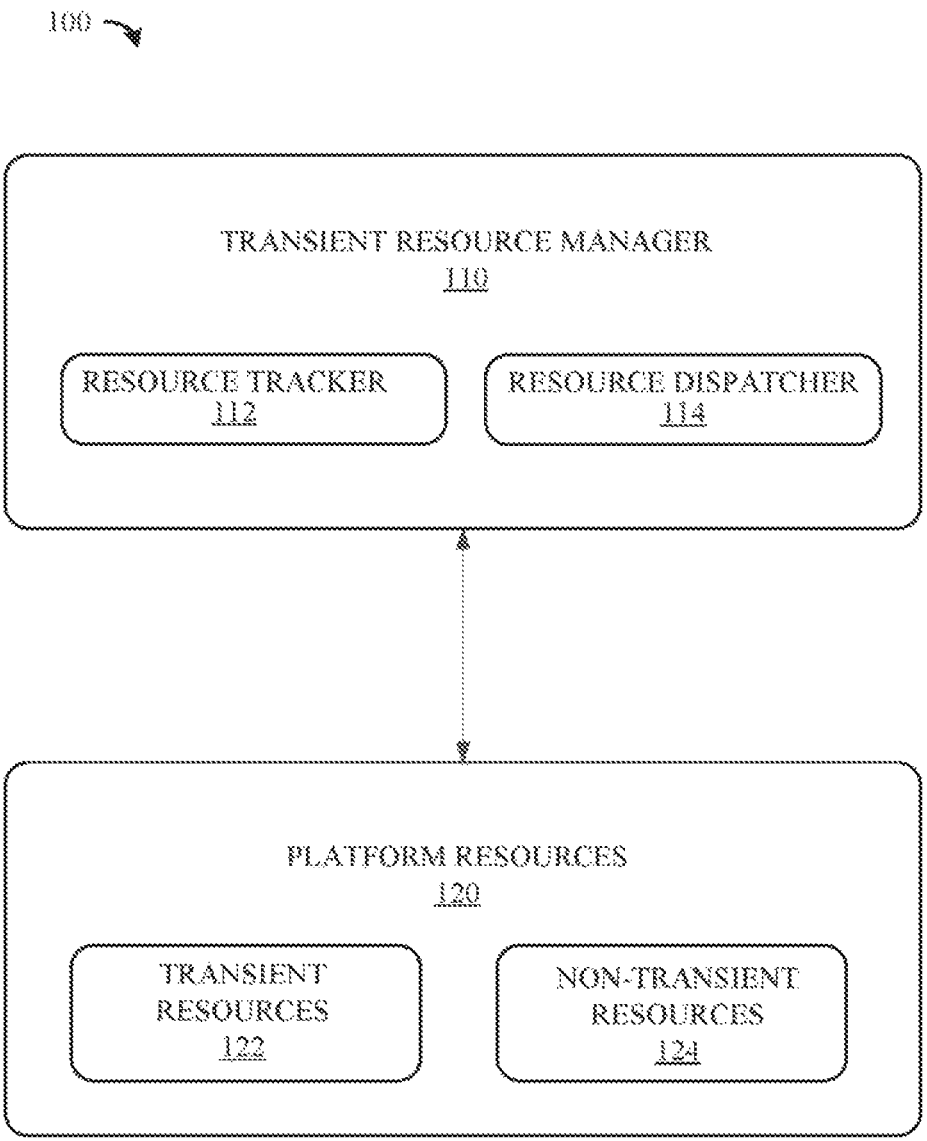
FIG. 1 is a block diagram of an exemplary operating environment suitable for implementing at least one aspect of the present disclosure.

Large-scale cloud providers made large infrastructure investments to their data centers. The return of their investments is eclipsed by low utilization rates of those computing resources. The utilization rate can be improved by effectively utilizing transient resources, e.g., temporarily spare computing capacities associated with the cloud provider infrastructure. Ideal candidate workload for utilizing transient resources would be delay-insensitive batch workloads, for example, big data analytics.

Big data analytics jobs, machine-learning training, or similar delay-insensitive or non-customer facing workloads are suitable to run on transient resources since these jobs are expensive, but not latency critical. Further, these types of jobs can often be divided into parallel jobs to be run concurrently. Logically, such delay-insensitive batch workloads could run as lower priority tasks in the computing cluster and use transient resources whenever they are available. Further, such delay-insensitive batch workloads could be evicted from transient resources when other tasks with higher priority require more resources.

From this perspective, delay-insensitive batch workloads would seem to be an ideal fit to run opportunistically on such transient resources in the cloud. However, one inherent challenge with running any workload on transient resources is that transient resources are fundamentally instable. As an example, a currently unused standby node as a resource buffer may suddenly be utilized in case of a failure in another node. As another example, spare capacity provisioned for load-spikes vanishes whenever a spike occurs. Consequential to the instable nature of transient resources, the cascading recomputation cost to resume the incomplete tasks may be substantial.

Present modern distributed data processing systems, such as MapReduce, Spark, or Scope, are designed to run as the primary task on dedicated hardware. These systems can perform stably and efficiently only if resource failures are rare events. If such failures are very rare, the cost of recomputation may be acceptable. When computing on transient resources in the cloud, however, the failure of a transient resource (e.g., becoming unavailable) can not only be expected but occur often. Modern distributed data processing systems generally perform poorly on transient resources because of the exceedingly high cost of requisite cascading recomputations, e.g., in case of eviction. Experimentally, even at small degrees of resource instability, these modern distributed data processing systems either take an excessive amount of time to complete a job, or even fail to complete the job entirely.

Using Spark as an example, it has many limitations in the context of running on transient resources. Spark's checkpointing is coarse grained checkpointing, such that Spark must checkpoint all data within a Resilient Distributed Dataset (RDD) in each checkpointing action. Even worse, high-level Spark APIs (e.g., SQL) do not support checkpointing. The checkpointing mechanisms in Spark cannot be adaptive to a dynamic unstable environment because the checkpoint must be written by the developer in the application, and the developer needs to determine what is to be checkpointed beforehand. When running Spark on unstable resources, these limitations make Spark unstable and inefficient.

In this disclosure, new technologies are provisioned to enable batch workloads to be effectively and efficiently executed on transient resources, e.g., as secondary background tasks. Specifically, new technologies for resource-stability and data-size reduction-aware scheduling (referred to as TR-Scheduling hereinafter), and resource-stability and task-dependency-aware checkpointing (referred to as TR-Checkpointing hereinafter) are disclosed herein to overcome the aforementioned problems associated with excessive recomputation cost in the traditional systems. In this way, nodes that are temporarily not being fully utilized in a data center may be more fully utilized.

Using the TR-Scheduling technology, a task is selected to run on transient resources according to the rate of data size reduction of the task. A task effectuating a greater data size reduction compared to other tasks may be prioritized to use transient resources. Such data-size reduction-aware scheduling may significantly reduce the number of recomputations if the task that outputs the least amount of data is prioritized during task scheduling. Further, the overall burden for data manipulation in the system may be reduced globally as the downstream tasks may have less output data to process and back up.

Using the TR-Checkpointing technology, a checkpointing decision (e.g., what data to back up, when to back up, where to back up, etc.) is made according to the instability information (e.g., VM lifetime distribution) of the transient resource, the estimated recomputation cost, and the dependency information among tasks. In this way, the recomputation cost for a job running on transient resources can be reduced by selectively backing up intermediate output data.

Experimental results show that TR-Spark scales near-optimally on transient resources with various instability configurations. In terms of performance, the original Spark performs poorly or even fails to complete jobs when the resources become less stable. In contrast, TR-Spark always performs well with different resource stabilities. With TR-Scheduling, the performance of a cluster remains stable for unstable resources because TR-Scheduling can reduce the number of costly checkpointing processes, thus reducing the total number of recomputations by prioritizing tasks that can reduce the output data size the most. In terms of scalability, TR-Spark is highly effective at different cluster sizes. In terms of the impact of bandwidth for backing up data, TR-Spark becomes more efficient when the local or remote bandwidth increases as the checkpointing cost becomes cheaper. In a direct comparison, the original Spark still performs poorly with unstable resources even if with increased bandwidth for backing up data.

TR-Spark is also robust to imprecise estimations of resource stability. In TR-Spark, the cost calculation in TR-Scheduling and TR-Checkpointing are based at least in part on the instability information of transient resources. Imprecision of resource stability estimation (e.g., the mean lifetime estimation of a transient resource) will likely degrade the performance of TR-Spark. However, experiments show that even after introducing substantial errors to resource stability estimation (e.g., up to 50% errors), the performance degradation is still acceptable. In summary, the experimental evaluations in both simulator and real cloud environments confirm the efficiency and effectiveness of TR-Spark for computing on transient resources.

Having briefly described an overview of aspects of the technology described herein, an exemplary operating environment in which aspects of the technology described herein may be implemented is described below. Referring to the figures in general and initially to FIG. 1 in particular, an exemplary operating environment for implementing technology described herein is shown and designated generally as exemplary operating environment 100. The exemplary operating environment 100 is one example of a suitable computing environment and is not intended to suggest any limitation as to the scope of use or functionality of aspects of the technology described herein. Neither should the exemplary operating environment 100 be interpreted as having any dependency or requirement relating to any one component nor any combination of components illustrated.

Turning now to FIG. 1, a block diagram is provided showing an example operating environment 100 in which some aspects of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes transient resource manager 110, which uses resource tracker 112 and resource dispatcher 114 to manage platform resources 120. Platform resources 120 include transient resources 122 and non-transient resources 124. In various embodiments, example operating environment 100 may use TR-Scheduling and TR-Checkpointing technologies to improve the utilization of platform resources 120.

Transient resource manager 110 oversees all jobs submitted to a physical or logical computing unit. As an example, an instance of transient resource manager 110 may be created for a data center, a cluster, a rack, a physical machine, etc. As another example, an instance of transient resource manager 110 may be created for a logical computing unit, e.g., a pool of physical or virtual machines assigned to a user or a project.

Resource tracker 112 operates to monitor the availability and stability information of transient resources 122 and non-transient resources 124. In various embodiments, resource tracker 112 may determine and store information of transient resources 122 to suitable data structures. In some embodiments, the lifetime of a transient resource may be deterministic, such as predetermined in the exemplary operating environment 100. In other embodiments, resource tracker 112 may estimate the expected lifetime of a transient resource or the probability distribution of the failure of the transient resource. Lifetime can refer to a single instance of availability of the transient resource prior to a failure or being used as a non-transient resource.

Resource dispatcher 114 provides checkpointing and scheduling mechanisms to facilitate transient resources 122 to be used by suitable tasks. In various embodiments, resource dispatcher 114 enables task-level scheduling and self-adaptive checkpointing technologies for reducing the number of recomputations caused by resource instability, and therefore improves stability and efficiency of computing on platform resources 120, particularly on transient resources 122.

Transient resources 122 are computing resources that are presently available to be used temporarily, while non-transient resources 124 are computing resources that are typically only available for a specific purpose. Non-transient resources 124 may include dedicated hardware or software, e.g., used for a specific purpose. Non-transient resources 124 may include failed hardware or software, e.g., non-responsive to an inquiry from resource tracker 112. Transient resources 122 may include idle resources, reserved resources to handle load-spikes, or even under-utilized resources. In some embodiments, transient resources 122 include any available VMs, particularly when VMs are used as the unit of computation. In other embodiments, transient resources 122 include units of nodes, servers, machines, containers, etc.

The exemplary operating environment 100 shown in FIG. 1 is an example of one suitable operating environment. In one embodiment, all of the components shown in FIG. 1 may be implemented in one computing device, such as computing device 700 described in connection to FIG. 7, for example. In some embodiments, some of the components shown in FIG. 1 may be implemented in different components, e.g., in cloud computing platform 810 of FIG. 8. By way of example, transient resources 122 may be located at resources 860 while resource dispatcher 114 may be located at fabric controller 840 or host 850 of FIG. 8. In general, components depicted in FIG. 1 may communicate with each other via a bus (e.g., bus 710 depicted in FIG. 7) or via a network, which may include, without limitation, one or more local area networks (LANs) and/or wide area networks (WANs).

Figure 2:
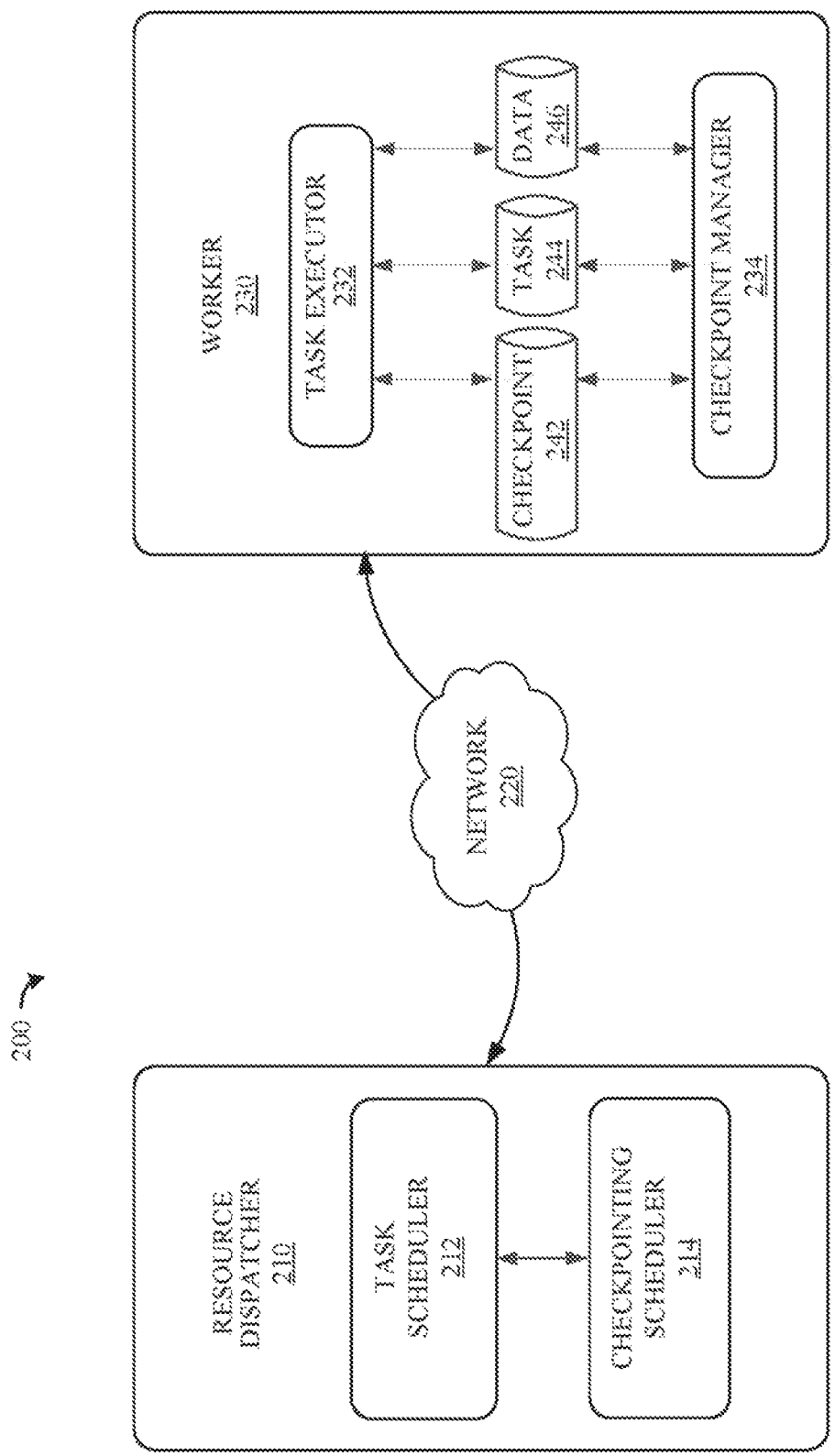
FIG. 2 is a block diagram depicting an exemplary distributed computing architecture suitable for implementing at least one aspect of the present disclosure.

Referring now to FIG. 2, a block diagram is provided showing aspects of an exemplary distributed computing architecture suitable for implementing at least one aspect of the present disclosure and designated generally as system 200. System 200 includes resource dispatcher 210 communicative coupled to worker 230, e.g., via network 220. In some embodiments, resource dispatcher 210 may communicate with multiple instances of worker 230 in system 200, e.g., for different jobs or users. In some embodiments, resource dispatcher 210 includes task scheduler 212 coupled with checkpointing scheduler 214. In some embodiments, worker 230 includes task executor 232 coupled with checkpoint manager 234. Task executor 232 and checkpoint manager 234 may exchange information about checkpoint 242, task 244, and data 246.

In various embodiments, resource dispatcher 210 functions like resource dispatcher 114, in FIG. 1, to enable task-level scheduling and self-adaptive checkpointing technologies in system 200. Resource dispatcher 210 operates to improve stability and efficiency of computing on transient resources, e.g., by reducing recomputations caused by resource instability.

Task scheduler 212 implements TR-Scheduling, which uses instability information of transient resources and information of data size reduction of tasks to make task scheduling decisions. Task scheduler 212 operates to match a transient resource (e.g., a free core, a VM, etc.) to a pending task. In one embodiment, task scheduler 212 maintains a list of nonblocking tasks, which have their prerequisites fulfilled and are ready to be executed. A nonblocking task also has no dependencies for additional input data from other tasks.

A computing job may be divided into stages that are units of execution. These stages would have a topological order, e.g., based on their interdependencies. By way of example, a part of the output of one stage is a part of the input to another stage. Therefore, a stage needs to be executed before another stage, due to their dependency. A stage may include a set of independent tasks all computing the same function as part of the job. A stage may include a set of parallel tasks that collectively compute partial results, including intermediate results, of the job. Those parallel tasks may have the same dependencies or prerequisites. In some embodiments, multiple lists of nonblocking tasks may be established for respective stages in a computing job. To achieve that, task scheduler 212 may maintain a list of nonblocking stages, which have no pending dependencies for other stages.

To reduce the recomputation cost for computing on transient resources, task scheduler 212 may prioritize the nonblocking stage that has the greatest rate of data size reduction from a list of nonblocking stages for scheduling, e.g., as illustrated in lines 4-6 of the exemplary TR-Scheduling process in Table 1. Similarly, task scheduler 212 may prioritize the nonblocking task that has the greatest data size reduction rate from the list of nonblocking tasks in the stage for scheduling, e.g., as illustrated in lines 12-20 of the exemplary TR-Scheduling process in Table 1. In this way, tasks with greater data size reduction potential are selected from the list of nonblocking tasks for scheduling. The downstream stages will be less burdened for data processing. As another benefit, this data size reduction strategy also makes subsequent checkpointing and backup more efficient by effectively reducing the size of data for checkpointing and backup.

In addition to the data reduction factor, task scheduler 212 may also consider the factor of task execution time. For example, task scheduler 212 may treat a task with a shorter execution time as having less risk of being impacted by a failure of the transient resources, and thus as having a higher probability of reducing recomputations. In addition to the data reduction factor, task scheduler 212 may also consider the expected stability of the underlying resource, or other factors, such as the priority of the task, or the relative location of the task within the topological ordering of all outstanding tasks.

The exemplary TR-Scheduling process in Table 1 illustrates one embodiment in which task scheduler 212 considers both the data reduction factor and the task execution time factor for scheduling. In this embodiment, for an available resource on VM v, TR-Scheduling prioritizes the tasks based on the likelihood of the task to complete on the transient resource. In one embodiment, a ratio of an expected execution time of the task and an expected lifetime of the transient resource is determined, and the ratio is compared with a predetermined threshold. By way of example, in Table 1, if the ratio is less than the threshold (y), then the task will be considered for assignment. When the VM's lifetime can be accurately obtained, y may be set to 1.

Further, the task with the greatest rate of data size reduction may be assigned with the highest priority. For a task t, its data size reduction rate is calculated as reduceSizeRate=reduceSize/ET, where ET is the estimated execution time of task t. Task scheduler 212 can determine the output and input data sizes of each task to compute reduceSize, which is Size(OutputData)−Size(InputData). If the data is not located on the current VM, then Size (InputData) may be set to 0. The rate of data size reduction of a stage may be similarly determined. In one embodiment, the rate of data size reduction of a stage is determined based on respective rates of data size reduction of the parallel tasks in the stage, e.g., based on the aggregated or average rate of data size reduction of those task in the stage. The stage with the maximum rate of data size reduction may be assigned with the highest priority, e.g., as illustrated at line 5 of Table 1.

TABLE 1

Exemplary Process in TR-Scheduling

1: Input: VM v with a free core, γ, K, candidateStages
2: Output: Task Id
3: Initialize currentBestTaskId, candidateTasks, stage to null
4: if (stage is null) then
5:     stage ← selects max reduceSizeRate stage from candidateStages
6: end if
7: for each task Id i in stage do 8:     if $\frac{taskSet[i].ET}{v.E(t,T)} < \gamma$ then 9:         Push I to candidateTasks
10:    end if
11: end for
12: for each task Id j in candidateTasks do
13:    if currentBestTaskId is null then
14:        currentBestTaskId = j
15:    else
16:        currentBestTaskId ← max(
17:    candidateTasks[currentBestTaskId].reduceSizeRate,
18:    candidateTasks[j].reduceSizeRate)
19:    end if
20: end for
21: return currentBestTaskId Once a task is matched with a transient resource, task scheduler 212 sends information of the task and the transient resource to task executor 232. Task executor 232 will execute the task using the transient resource, and store data related to the task (e.g., output datasets from the task) to data 246. Specifically, task executor 232 will determine the output data blocks associated with the task. Further, task executor 232 can also save the information of the task to task 244 and save the output data blocks to data 246.

Checkpointing scheduler 214 implements TR-Checkpointing, which uses dependency information of tasks, instability information of transient resources, and adaptive techniques to make task checkpointing decisions. Embodiments of various checkpointing decisions are further discussed in more detail in connection with FIG. 3.

In one embodiment, checkpointing scheduler 214 collects instability information of transient resources, e.g., from resource tracker 112 of FIG. 1 to determine a checkpointing plan for a task. Subsequently, checkpointing scheduler 214 sends the checkpointing plan to checkpoint manager 234. By way of example, the checkpointing plan may include a tuple of an identification for a task and its related backup plan. In another example, the checkpointing plan may include an identification for the checkpointing plan, another identification for the task, and yet another identification for the output data block to be backed up.

Checkpoint manager 234 may receive checkpointing plans from checkpointing scheduler 214 and store the checkpointing plans at checkpoint 242. In some embodiments, a checkpointing plan includes an identification for the checkpointing plan (e.g., checkpointing plan identification), an identification for the task (e.g., task identification), and an identification for the output data block (e.g., data identification). In this way, checkpoint manager 234 can execute the checkpointing plan based on those identifications.

Checkpoint manager 234 can execute the checkpointing plans in checkpoint 242 based on an order, e.g., first-infirst-out (FIFO), first-in-last-out (FILO), etc. In one embodiment, checkpoint 242 includes a data structure of a stack to store checkpointing plans. Using the FILO property of the stack, checkpoint manager 234 can effectively back up the data blocks specified in the most recent checkpointing plan. With the FILO order, some prior checkpointing plans may no longer need to be executed anymore after the execution of the most recent checkpointing plan if no more tasks will have dependencies on those prior checkpointing plans. Beneficially, through the FILO order, checkpoint manager 234 may further reduce the cost (e.g., backup cost) to execute those checkpointing plans.

Checkpoint manager 234 is responsible for backing up data based on a checkpointing plan to local or remote storage. In general, a remote storage is likely more reliable, but with greater backup cost. Sometimes, it is cost-effective to back up the output data block of a task to another transient resource that has a longer expected lifetime compared with the transient resource used by the task.

Besides maintaining and executing those checkpointing plans, checkpoint manager 234 may periodically send back status information of those checkpointing plans to checkpointing scheduler 214. After receiving the checkpointing status from checkpoint manager 234, checkpointing scheduler 214 may update the new data location for the related tasks, stages, or jobs, e.g., in a table for tracking such information. Further, checkpointing scheduler 214 may adjust an existing checkpointing plan based on such status information. By way of example, checkpointing scheduler 214 may determine another existing checkpointing plan is no longer needed due to the completion of a downstream task.

Scheduling and checkpointing are important aspects of computing on transient resources. System 200 enables task-level scheduling and self-adaptive checkpointing technologies to improve stability and efficiency of computing on transient resources. System 200 represents only one example of a suitable computing system architecture. Other arrangements and elements can be used in addition to or instead of those shown, and some elements may be omitted altogether for the sake of clarity. Further, many of the elements described herein are functional entities that may be implemented as discrete or distributed components or in conjunction with other components, and in any suitable combination and location.

Figure 3:
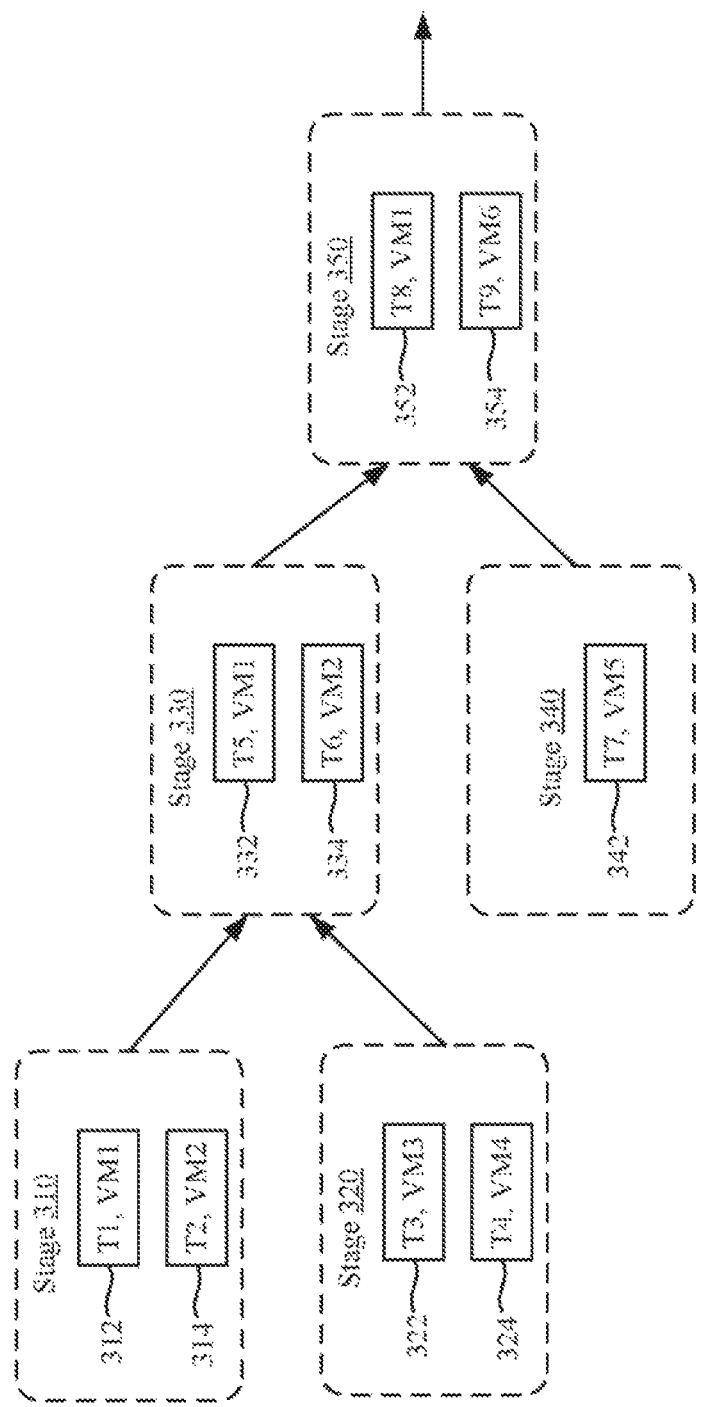
FIG. 3 is an illustrated diagram depicting an exemplary computing job managed in accordance with at least one aspect of the present disclosure.

FIG. 3 shows an illustrated diagram depicting an exemplary computing job managed in accordance with some aspects of the present disclosure. In FIG. 3, a job is divided into various stages, including stage 310, stage 320, stage 330, stage 340, stage 350, and other stages not shown in FIG. 3. Each stage includes one or more tasks. These stages and tasks form a directed acyclic graph (DAG), and dependencies may exist between two stages. By way of example, stage 330 needs input from stage 310 and stage 320. In other words, tasks in stage 330 cannot be completely executed without the completion of stage 310 and stage 320. Similarly, stage 350 depends on stage 330 and stage 340.

As discussed in connection with FIG. 2, checkpointing is necessary to reduce recomputations when operating in an environment with transient resources. On the other hand, checkpointing is an expensive computation process, e.g., for the backup cost. Checkpointing scheduler 214 determines the checkpointing plan, including whether to back up a data block for a task and if so, where to back up the data block, e.g., locally or remotely. In various embodiments, checkpointing scheduler 214 is to improve the efficiency of computing on transient resources by checkpointing necessary data blocks to the right location at the right time.

In some embodiments, checkpointing scheduler 214 operates to target those data blocks for backup based on two principles. First, the transient resource will likely fail before a data block is consumed by at least one downstream task. Second, the recomputation cost associated with the data block is greater than the backup cost for the data block. If a data block can be read and processed by the present task and all relevant downstream tasks before the transient resource fails, this data block does not need to be backed up. The first principle ensures that checkpointing scheduler 214 only considers some selective data blocks in high risk of recomputation as checkpointing candidates. However, the failure of a transient resource is difficult to be accurately predicted in some embodiments. In those embodiments, checkpointing scheduler 214 takes a probabilistic approach and assigns a lower priority to the data blocks with higher probability of being consumed soon in the backup candidate list.

For every backup candidate, based on the second principle, checkpointing scheduler 214 further compares the backup cost to the hypothetical recomputation cost for regenerating this data block to ensure the efficiency of the entire job. Backups to remote reliable storage (e.g., Azure Blob or a dedicate Hadoop Distributed File System (HDFS) cluster) have typically higher backup costs than backups to another local storage, e.g., due to the differences in bandwidth and network delays. On the other hand, backing up data blocks to a local storage in a transient resource environment has the risk that the local storage may also be unstable. Thus, when backing up to a local storage, checkpointing scheduler 214 also factors in the additional hypothetical recomputation cost that will be incurred if the transient resource supporting the local backup fails before the data block is consumed, e.g., by a downstream task. These and other aspects of cost estimation and comparison are further discussed in detail in connection with FIG. 6.

In FIG. 3, different checkpointing strategies may be used. The simplest possible solution to reduce recomputation cost can be to perform periodic checkpointing or checkpointing for all data blocks. As an example, checkpointing can be scheduled for every stage or every task. As another example, checkpointing can be scheduled for every data block. Checkpointing everything may be implemented as a conservative choice to guarantee the fewest number of recomputations, but with the greatest cost for all checkpointing processes since it requires substantial communication and I/O for saving all data blocks, including intermediate results. Further, always checkpointing fails to adapt to the instability of the environment and becomes inefficient as it backs up every data block.

When the TR-checkpointing technology is used, checkpointing scheduler 214 operates to make checkpointing decisions based at least in part on the instability information of the transient resources, the dependency information of the tasks, and the backup cost information. With a resource instability distribution estimation, checkpointing scheduler 214 can determine a failure probability range for the transient resource. With the dependency information of the tasks, checkpointing scheduler 214 can determine the expected cascading recomputation cost. With the backup cost information (e.g., the bandwidth and latency of the route to save data blocks), checkpointing scheduler 214 can determine the checkpointing cost. Then, checkpointing scheduler 214 can make the decision of whether to checkpoint a data block and try to achieve an optimal trade-off between recomputation and checkpointing. In various embodiments, checkpointing decisions made by checkpointing scheduler 214 are transparent to the job, the application, or the user so that jobs can run on transient resources without additional programming or configurations.

When the TR-checkpointing technology is used, checkpointing scheduler 214 can make fine-grained checkpointing decisions at the task level. In other words, checkpointing decisions can be made for individual tasks. Usually, stage level checkpointing incurs excessive checkpointing overhead. Compared to stage level checkpointing, e.g., used in Spark, checkpointing scheduler 214 can checkpoint an individual task in a stage that needs checkpointing (e.g., when the underlying transient resource is likely to fail) without checkpointing other tasks that run on stable resources.

In FIG. 3, block 312 refers to task T1 running on a transient resource VM1 while block 314 refers to task T2 running on another transient resource VM2. Block 322 refers to task T3 running on VM3 while block 324 refers to task T4 running on VM4. The output from stage 310 and stage 320 feeds into stage 330, in which block 332 refers to task T5 running on VM1 while block 334 refers to task T6 running on VM2. Noticeably, stage 330 reuses the same set of VMs, namely VM1 and VM2. Stage 340 has only one task T7, and block 342 refers to task T7 running on VM5. Further, stage 350 waits for its input from stage 330 and stage 340 so that tasks in stage 350 may start to run. Block 352 refers to task T8 running on VM1 while block 354 refers to task T9 running on VM6.

Suppose checkpointing scheduler 214 estimates that the transient resource VM1 will likely fail at this point based on the instability information of VM1, but VM6 is stable. In this situation, checkpointing scheduler 214 will make a checkpointing plan for task T8 running on VM1 only. Further suppose VM1 outputs a list of data blocks, identified with a ShuffleBlockID, for T8. In this case, checkpointing scheduler 214 can make a checkpointing plan for the list of data blocks identified by the ShuffleBlockID without considering T9 running on VM6. Since the tasks in the same stage may run on different VMs with different stabilities, thus finer grained checkpointing offers more flexibility to achieve better checkpointing plans, e.g., which reduce the overall checkpointing cost.

Figure 4:
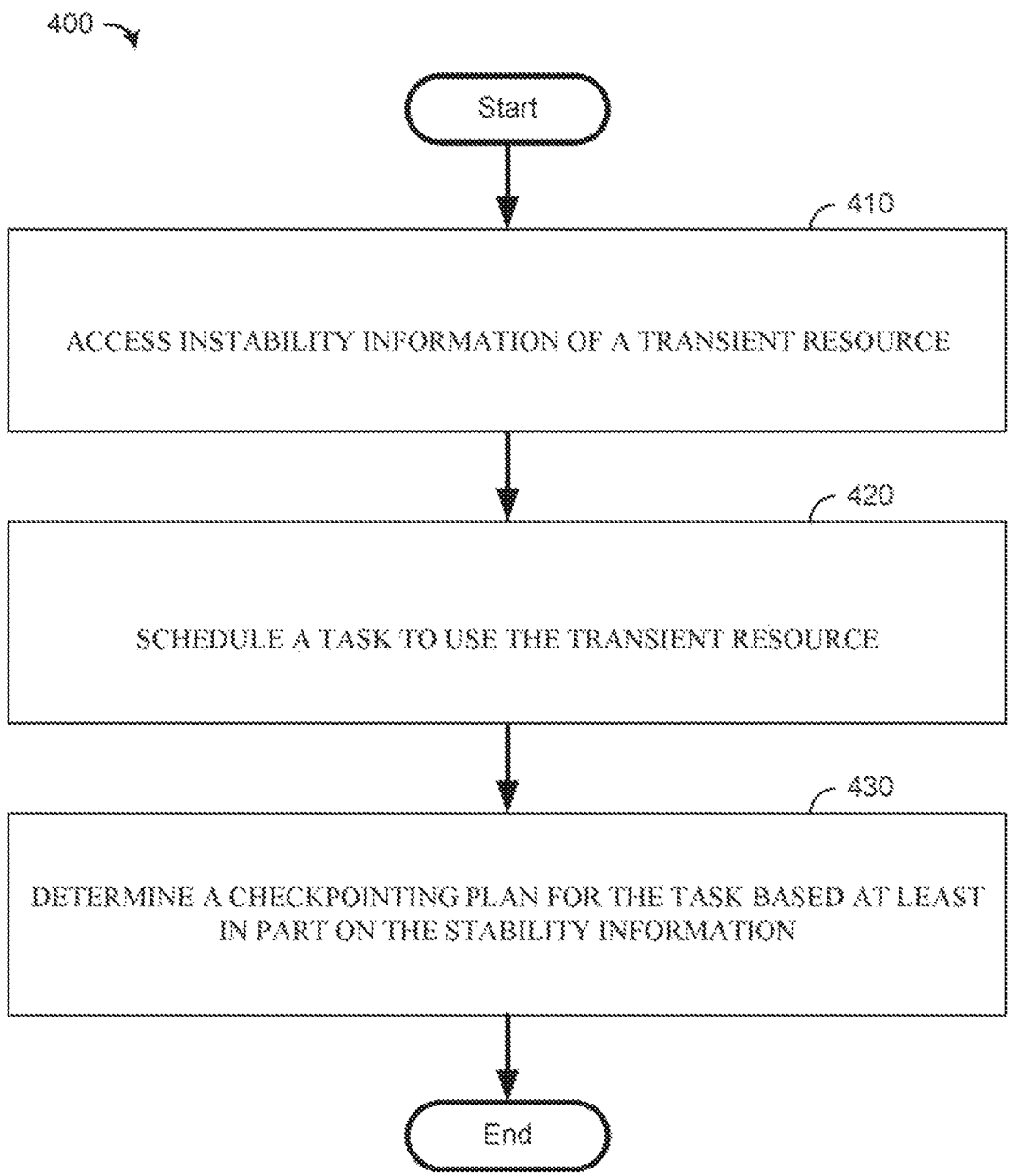
FIG. 4 is a flow diagram showing an exemplary process for computing on transient resources, in accordance with at least one aspect of the present disclosure.

Turning now to FIG. 4, a flow diagram is illustrated showing an exemplary process 400 for computing on transient resources, in accordance with an aspect of the technology described herein. Process 400 may be performed by one or more computing devices, such as transient resource manager 110 of FIG. 1 or resource dispatcher 210 or worker 230 of FIG. 2. In various embodiments, process 400 may be executed by a computing device, such as computing device 700 of FIG. 7, in a computing environment, such as distributed computing environment 800 of FIG. 8.

At block 410, instability information of a transient resource may be gathered, e.g., by resource tracker 112 of FIG. 1, and further be accessed, e.g., by resource dispatcher 114 of FIG. 1 or resource dispatcher 210 of FIG. 2. Different types of transient resources may have different instability information, e.g., probabilities of failure at any given time. In some embodiments, a resource dispatcher may directly access the distribution of the lifetime (i.e., time until failure) of a transient resource, e.g., from resource tracker 112. In some embodiments, such instability information may be provided by the underlying operating system, the platform, the user, etc. In this way, a resource dispatcher may access the exact lifetime distribution of a transient resource since that instability information is readily available. In some embodiments, checkpointing scheduler 214 cannot readily access any existing instability information of a transient resource. In this case, checkpointing scheduler 214 may determine a statistical distribution function of the failure probability of the transient resource based on, e.g., historical lifetime distribution information of similar transient resources.

At block 420, a task may be scheduled to use the transient resource, e.g., by task scheduler 212 of FIG. 2. Task scheduler 212 implements the TR-Scheduling technology, which uses instability information of transient resources and information of data size reduction of tasks to make task scheduling decisions. As a result, a transient resource (e.g., a free core, a VM, etc.) may be assigned to a pending task. The TR-Scheduling technology is further discussed in connection with FIG. 5.

At block 430, a checkpointing plan for the task may be determined, e.g., by checkpointing scheduler 214 of FIG. 2, based at least in part on the stability information of the transient resource. When the TR-Checkpointing technology is employed, checkpointing scheduler 214 will make checkpointing decisions based on the instability information (e.g., lifetime distribution) of the transient resource, the estimated recomputation cost, and the dependency information among tasks. In this way, the checkpointing plans may be made at the task level and reserved for only those tasks in which a checkpointing plan will be cost-effective. The TR-Checkpointing technology is further discussed in connection with FIG. 6.

Figure 5:
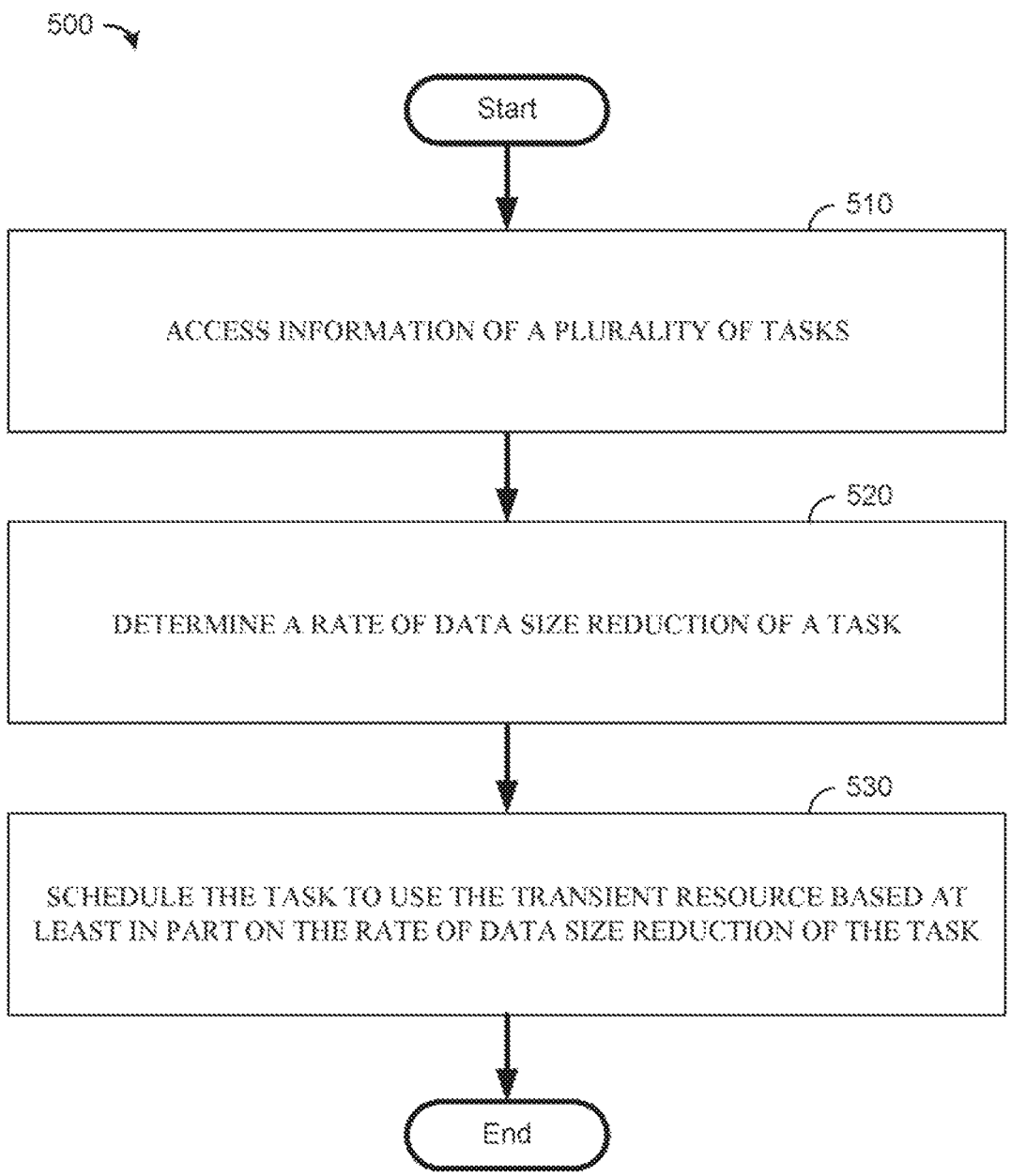
FIG. 5 is a flow diagram showing an exemplary process for scheduling a task, in accordance with at least one aspect of the present disclosure.

Turning now to FIG. 5, a flow diagram is illustrated showing an exemplary process for scheduling a task to use the transient resource, in accordance with an aspect of the technology described herein. Process 500 may be performed by one or more computing devices, such as resource dispatcher 114 of FIG. 1 or resource dispatcher 210 of FIG. 2. In various embodiments, process 500 may be executed by a computing device, such as computing device 700 of FIG. 7, in a computing environment, such as distributed computing environment 800 of FIG. 8.

At block 510, information of multiple computing tasks may be accessed, e.g., by task scheduler 212 of FIG. 2. In various embodiments, those tasks are nonblocking tasks from various stages of a job. In some embodiments, those tasks are parallel tasks from the same stage.

At block 520, a rate of data size reduction of a task may be determined, e.g., by task scheduler 212 of FIG. 2. As previous discussed, task scheduler 212 can determine the output and input data sizes of each task, then compute the data size reduction, such as the difference between the output data size and the input data size. Further, task scheduler 212 may access or determine the estimated execution time of the task. Accordingly, the rate of data size reduction may be obtained by the division of the data size reduction and the estimated execution time.

At block 530, the task is scheduled to use the transient resource based at least in part on the rate of data size reduction of the task, e.g., by task scheduler 212 of FIG. 2. In various embodiments, task scheduler 212 may prioritize tasks with great rate of data size reduction when transient resources are in limited supply. Such data-size reduction-aware scheduling may significantly reduce the number of recomputations in the future. Further, the overall burden for data manipulation in the system may be reduced globally as the downstream tasks may have less output data to process and back up.

Figure 6:
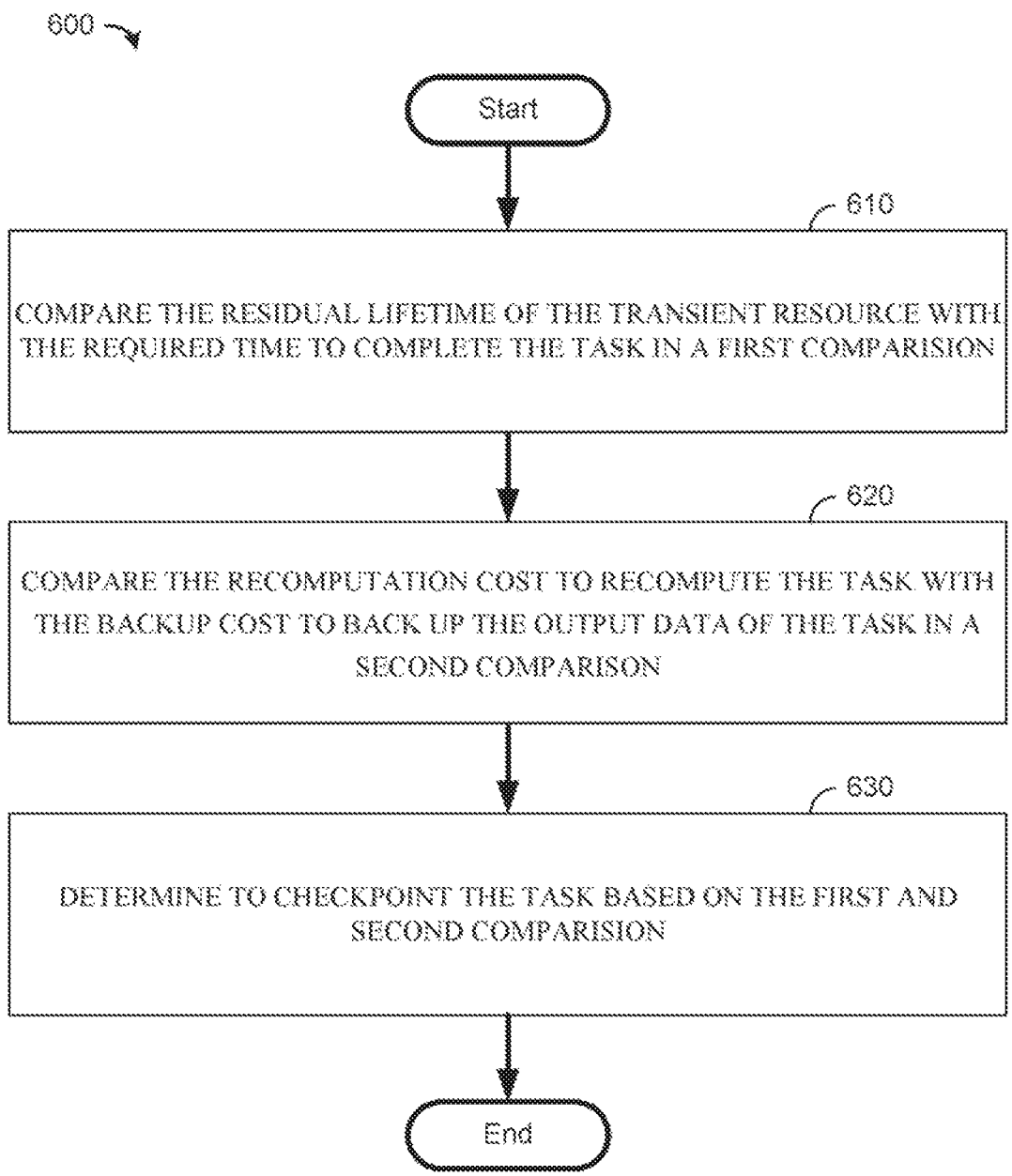
FIG. 6 is a flow diagram showing an exemplary process for checkpointing a task, in accordance with at least one aspect of the present disclosure.

Turning now to FIG. 6, a flow diagram is illustrated showing an exemplary process for checkpointing a task, in accordance with an aspect of the technology described herein. Process 600 may be performed by one or more computing devices, such as resource dispatcher 114 of FIG. 1 or resource dispatcher 210 of FIG. 2. In various embodiments, process 600 may be executed by a computing device, such as computing device 700 of FIG. 7, in a computing environment, such as distributed computing environment 800 of FIG. 8.

Process 600 shows that the TR-Checkpointing technology adapts to the instability characteristics of transient resources. When a transient resource is stable, the failure probability of a transient resource and the possible recomputation cost are both small. Accordingly, there is no imminent need for checkpointing the task running on the transient resource. As the transient resource becomes unstable and the recomputation cost starts to increase (e.g., above a predetermined threshold), checkpointing decisions should be made. Further, when local resources exist that are suitable to be a backup destination, a local backup plan may be chosen. As the local resources become more unstable, a remote backup plan may be chosen to save data to a reliable remote destination.

At block 610, process 600 is to compare the residual lifetime of the transient resource with the required time to complete the task in a first comparison, e.g., by checkpointing scheduler 214 of FIG. 2. If the required time to complete the task is less than the residual lifetime of the transient resource, then there is no imminent need to checkpoint the task. On the other hand, if the transient resource will likely fail before the completion of the task, then a checkpointing plan may be needed for the task, e.g., depending on the comparison in block 620.

At block 620, process 600 is to compare the recomputation cost to recompute the task with the backup cost to back up the output data of the task in a second comparison, e.g., by checkpointing scheduler 214 of FIG. 2. If the recomputation cost is less than or equal to the backup cost, then it is cost-effective for not considering checkpointing the task. However, if the recomputation cost is greater than the backup cost, then a checkpointing plan should be considered. The cost of backing up to a local destination is likely different than the cost of backing up to a remote destination. Accordingly, a further decision may be made for the checkpointing plan based on the respective costs of backing up locally or remotely.

At block 630, process 600 is to determine to checkpoint the task based on the first and second comparisons, e.g., by checkpointing scheduler 214 of FIG. 2. If checkpointing scheduler 214 determines that the task is at risk as the underlying resources may fail before the completion of the task, the second comparison will be conducted. If checkpointing scheduler 214 further determines that the recomputation cost is greater than the backup cost, then checkpointing scheduler 214 will make a checkpointing plan for the task to save the data blocks for the task either locally or remotely.

An exemplary process of TR-Checkpointing is illustrated in Table 2 to further illustrate block 620 and block 630. In Table 2, to simplify the expression, transient resources are simply represented by VMs. Adapting to the instability characteristics of transient resources (e.g., stability distribution of the runtime environment for the transient resources), this exemplary process of TR-Checkpointing will also consider the dependency information among different stages or tasks from the DAG of each job, and the environment. In Table 2, the exemplary process is to find a proper local backup destination VM at lines 5-9. Further, the exemplary process is to implement block 620 and block 630 at lines 10-20.

TABLE 2

Exemplary Process in TR-Checkpointing

```
 1: Input: Data Block Set b
 2: C_BR = BackupRemoteCost( );
 3: C_Redo = RecomputationCost( );
 4: VM_id = FindLocalBackupDestination( );
 5: if VM_id > −1 then
 6:     C_BL = BackupLocalCost(VM_id);
 7: Else
 8:     C_BL = double.max;
 9: end if
10: if C_BL <= C_Redo then
11:     if C_BL <= C_BR then
12:         Backup to local VM VM_id;
13:     else
14:         Backup to remote;
15:     end if
16: else
17:     if C_Redo >= C_BR then
18:         Backup to remote;
19:     end if
20: end if
```

TR-Checkpointing may be triggered by either a new coming event (such as a task accomplishment) or periodically. The estimation of backup cost CBR, CBL, recomputation cost $C_{Redo}$, and VM's failure probability will be further discussed herein.

Given this lifetime distribution $f$ the probability of a transient resource a to fail exactly after running for time x is P=$f$(x), and $\int_0^\infty f(x)dx$=1. Assume that 1) has been running for time τ. Under this condition, the probability that v will fail at time t may be determined based on Eq. 1. The expected lifetime of v between time $t_i$ and $t_j$ may be determined based on Eq. 2.

$$f(\tau, t) = \frac{\int_\tau^t f(x)dx}{\int_\tau^\infty f(x)dx} \qquad \text{Eq. 1}$$

$$E(t_i, t_j) = \int_{t_i}^{t_j} f(\tau, t)t dt \qquad \text{Eq. 2}$$

The recomputation of a task k's output block $b_k$ is a cascading process, whose cost may be estimated by the cost of the current task k together with all of k's parent tasks if their input data is not available due to a failure of the transient resource on issue. Let $\tau_i$ be the existing running time of the transient resource which has data block $b_i$. Given the lifetime distribution of the transient resource, checkpointing scheduler 214 may determine the expected recomputation cost $C_{Redo}$ of data block $b_k$ based on Eq. 3. Er(t, k) is the expected recomputation cost of task k if the transient resource fails at time t. If $b_k$ is not consumed (there exist some tasks that depend on $b_k$), task k which generates this block $b_k$ needs a recomputation, then Er(t, k)≠0. Otherwise, Er(t, k)=0. Er(t, k) may be determined based on Eq. 4.

$$C_{Redo}(b_k) = \int_{t_c}^{T_{max}} f(\tau_k, t) Er(t,k) dt \qquad \text{Eq. 3}$$

$$Er(t,k) = C_k + \Sigma_{i \in set_N} Er(t,i) + \Sigma_{i \in set_A} f(\tau_j, t) Er(t,j) \qquad \text{Eq. 4}$$

In Eq. 4, k's expected recomputation cost Er consists of three components: the recomputation cost of k; the recomputation cost of k's dependent tasks, which also need to be recomputed; and the recomputation cost of k's dependent tasks, which may require recomputation at a near future time t. Here, $C_k$ is the running time (cost) of task k, which needs to be recomputed. The component of $\Sigma_{i \in set_N} Er(t, i)$ represents the recomputation cost of k's dependent tasks, which also need to be recomputed, and $Set_N$ is the set of k's dependent tasks whose result data blocks will be lost due to the failure of the transient resource. If k requires recomputation, these tasks in $Set_N$ also require recomputation.

The component of $\Sigma_{i \in set_A} f(\tau_j, t) Er(t, j)$ represents the recomputation cost of k's dependent tasks, which may require recomputation at a near future time t. $Set_A$ is the set of k's dependent tasks whose result data blocks are available now on some other transient resources, but will be lost at time t due to the failure of those transient resources. If k requires recomputation, some of the tasks in $Set_A$ also require recomputation, the cost of which can be calculated according to its VM's duration probability distribution.

The calculation of Er is thus recursive. In some embodiments, checkpointing scheduler 214 sets a recursion depth limitation to control the computation overhead for scheduling efficiency. A common recursion depth limitation may be set in advance for all jobs. Alternatively, an individualized recursion depth limitation may be set, e.g., based on the DAG of the job.

The backup cost parameters of CBR (i.e., $C_B$(remote)) and CBL (i.e., $C_B$(local)) represent two options, namely, to backup to remote reliable storage or to more stable local transient resources. Let BT(x)=Data Size/IO Cost(x), x=local for local backup time, and x=remote for remote backup time. The expected backup cost ($C_B$(x)) consists of three main components as illustrated in Eq. 5. The first component is for the backup cost when the transient resource fails before the backup is finished, which may be determined based on Eq. 6. The second component is for the recomputation cost when the transient resource fails before the backup is finished, which may be determined based on Eq. 7. The third component is for the backup cost when the transient resource fails after the backup operation is finished, which may be determined based on Eq. 8.

$$C_B(X) = C_{B1}(x) + C_R(x) + C_{B2}(X) \quad \text{Eq. 5}$$

$$C_{B1}(x) = \int_{t_c}^{t_c + BT(x)} f(\tau, t)(t - t_c) dt \quad \text{Eq. 6}$$

$$C_R(x) = \int_{t_c}^{t_c + BT(x)} f(\tau, t) * Er(t, k) dt \quad \text{Eq. 7}$$

$$C_{B2}(x) = BT \int_{t_c BT(x)} f(\tau, t) dt \quad \text{Eq. 8}$$

The cost estimation above is based on a parameter that characterizes the next stage's starting time, which is the earliest time for a data block to be consumed. It is non-trivial to accurately estimate this value due to the different starting and execution times of the tasks in the current stage. In the presence of failures, estimation becomes even more inaccurate.

In some embodiments, checkpointing scheduler 214 uses $$\frac{\sum_{PS} N_i * T_i}{\#core} * \alpha$$

for estimating the parameter, where $N_i$ is the number of tasks in stage i that have not yet finished. $T_i$ is the average running time of tasks in stage i and $\alpha >= 1$ is an inverse function of the instability of the transient resources. That means that as the transient resources become more unstable, a longer stage execution time estimation is obtained.

The above cost estimation models are applicable to different instability settings, such as deterministic and nondeterministic lifetime distributions of a transient resource. In some embodiments, in the case where no explicit information is available with high confidence, and the average failure rates are extremely high, the backup strategy in TR-Checkpointing would naturally reduce to an "always checkpointing" strategy, which backs up every data block to remote storage.

Further, the cost estimation is based on the transient resource's stability. In some embodiments, the actual resource stability may behave radically different from the assumed distributions. In this case, checkpointing scheduler 214 may add a safety rule. When the current task's total recomputation cost exceeds a predetermined threshold (e.g., related to the job's execution time) before the recomputation is started, then checkpointing scheduler 214 would forcibly trigger an always checkpointing policy for the task. In this way, checkpointing scheduler 214 can self-adjust to guarantee an acceptable performance.

Figure 7:
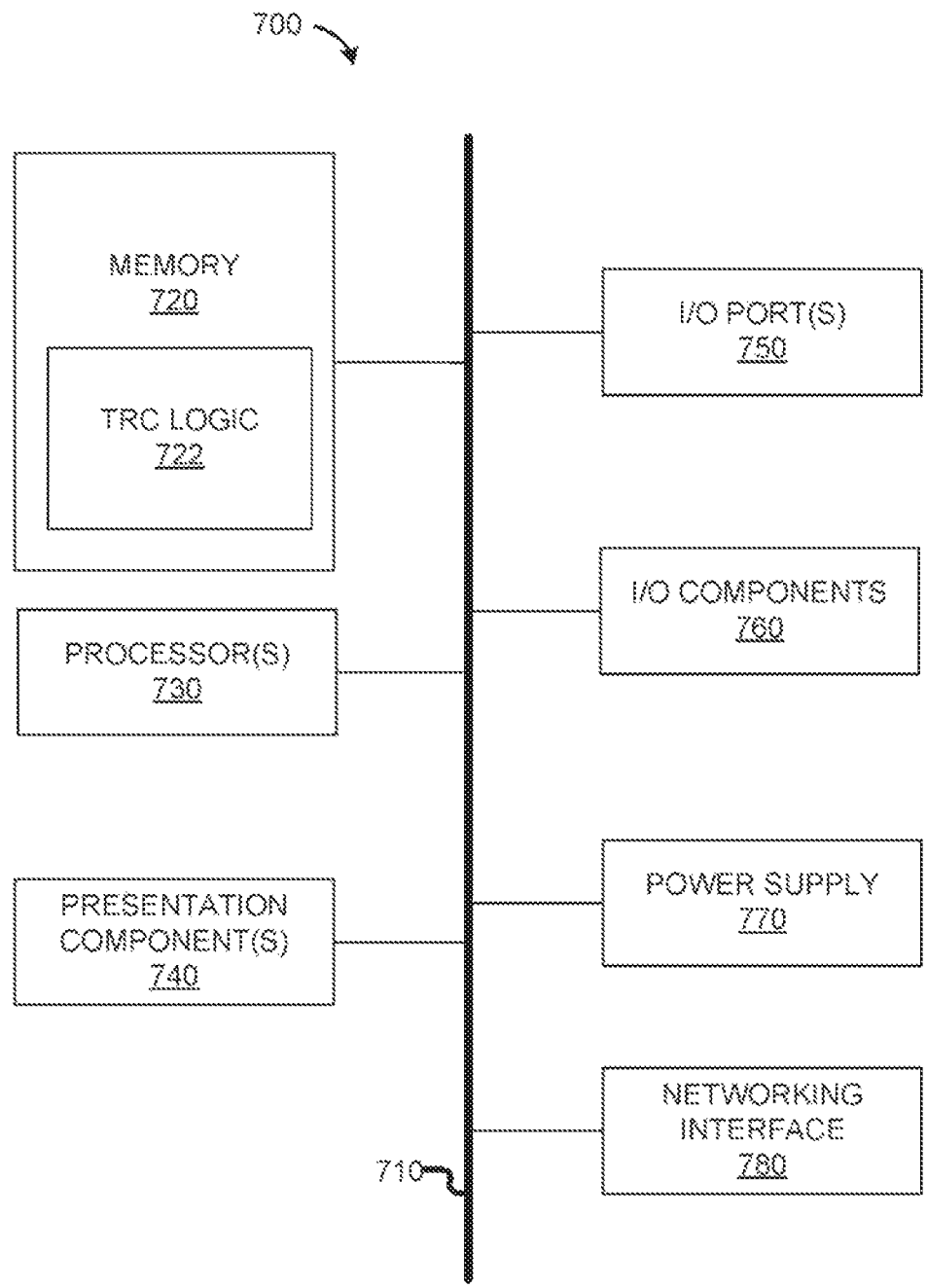
FIG. 7 is a block diagram of an exemplary computing environment suitable for use in implementing at least one aspect of the present disclosure.

Referring to the drawings in general, and initially to FIG. 7 in particular, an exemplary operating environment for implementing aspects of the technology described herein is shown and designated generally as computing device 700. Computing device 700 is but one example of a suitable computing environment and is not intended to suggest any limitation as to the scope of use of the technology described herein. Neither should the computing device 700 be interpreted as having any dependency or requirement relating to any one or combination of components illustrated.

The technology described herein may be described in the general context of computer code or machine-useable instructions, including computer-executable instructions such as program components, being executed by a computer or other machine. Generally, program components, including routines, programs, objects, components, data structures, and the like, refer to code that performs particular tasks or implements particular abstract data types. The technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are connected through a communications network, such as with a cloud computing platform.

With continued reference to FIG. 7, computing device 700 includes a bus 710 that directly or indirectly couples the following devices: memory 720, one or more processors 730, one or more presentation components 740, input/output (I/O) ports 750, I/O components 760, and an illustrative power supply 770. Bus 710 represents what may be one or more busses (such as an address bus, data bus, or a combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 7 is merely illustrative of an exemplary computing device that can be used in connection with one or more aspects of the technology described herein. Distinction is not made between such categories as "workstation," "server," "laptop," "handheld device," etc., as all are contemplated within the scope of FIG. 7 and refer to "computer" or "computing device."

Computing device 700 typically includes a variety of computer-readable media. Computer-readable media can be any available media that can be accessed by computing device 700 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 720 includes computer storage media in the form of volatile and/or nonvolatile memory. The memory 720 may be removable, non-removable, or a combination thereof. Exemplary memory includes solid-state memory, hard drives, optical-disc drives, etc. Computing device 700 includes one or more processors 730 that read data from various entities such as bus 710, memory 720, or I/O components 760. Presentation component(s) 740 present data indications to a user or other device. Exemplary presentation components 740 include a display device, speaker, printing component, vibrating component, etc. I/O ports 750 allow computing device 700 to be logically coupled to other devices, including I/O components 760, some of which may be built in.

In various embodiments, memory 720 includes, in particular, temporal and persistent copies of transient resource computing (TRC) logic 722. TRC logic 722 includes instructions that, when executed by one or more processors 730, result in computing device 700 performing various functions, such as, but not limited to, process 400, 500, or 600. In some embodiments, TRC logic 722 includes instructions that, when executed by processor(s) 730, result in computing device 700 performing various functions associated with, but not limited to, resource tracker 112 or resource dispatcher 114 in connection with FIG. 1. In some embodiments, TRC logic 722 includes instructions that, when executed by processor(s) 730, result in computing device 700 performing various functions associated with, but not limited to, task scheduler 212, checkpointing scheduler 214, task executor 232, or checkpoint manager 234 in connection with FIG. 2.

In some embodiments, one or more processors 730 may be packaged together with TRC logic 722. In some embodiments, one or more processors 730 may be packaged together with TRC logic 722 to form a System in Package (SiP). In some embodiments, one or more processors 730 can be integrated on the same die with TRC logic 722. In some embodiments, processors 730 can be integrated on the same die with TRC logic 722 to form a System on Chip (SoC).

Illustrative I/O components include a microphone, joystick, game pad, satellite dish, scanner, printer, display device, wireless device, a controller (such as a stylus, a keyboard, and a mouse), a natural user interface (NUI), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 730 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may coexist with the display area of a display device, be integrated with the display device, or may exist as a separate device overlaying or otherwise appended to a display device. Any and all such variations, and any combination thereof, are contemplated to be within the scope of aspects of the technology described herein.

Computing device 700 may include networking interface 780. The networking interface 780 includes a network interface controller (NIC) that transmits and receives data. The networking interface 780 may use wired technologies (e.g., coaxial cable, twisted pair, optical fiber, etc.) or wireless technologies (e.g., terrestrial microwave, communications satellites, cellular, radio and spread spectrum technologies, etc.). Particularly, the networking interface 780 may include a wireless terminal adapted to receive communications and media over various wireless networks. Computing device 700 may communicate via wireless protocols, such as Code Division Multiple Access (CDMA), Global System for Mobiles (GSM), or Time Division Multiple Access (TDMA), as well as others, to communicate with other devices via the networking interface 780. The radio communications may be a short-range connection, a long-range connection, or a combination of both a short-range and a long-range wireless telecommunications connection. A short-range connection may include a Wi-Fi® connection to a device (e.g., mobile hotspot) that provides access to a wireless communications network, such as a wireless local area network (WLAN) connection using the 802.11 protocol. A Bluetooth connection to another computing device is a second example of a short-range connection. A long-range connection may include a connection using one or more of CDMA, GPRS, GSM, TDMA, and 802.16 protocols.

The technology described herein has been described in relation to particular aspects, which are intended in all respects to be illustrative rather than restrictive. While the technology described herein is susceptible to various modifications and alternative constructions, certain illustrated aspects thereof are shown in the drawings and have been described above in detail. It should be understood, however, that there is no intention to limit the technology described herein to the specific forms disclosed, but on the contrary, the intention is to cover all modifications, alternative constructions, and equivalents falling within the spirit and scope of the technology described herein.

Figure 8:
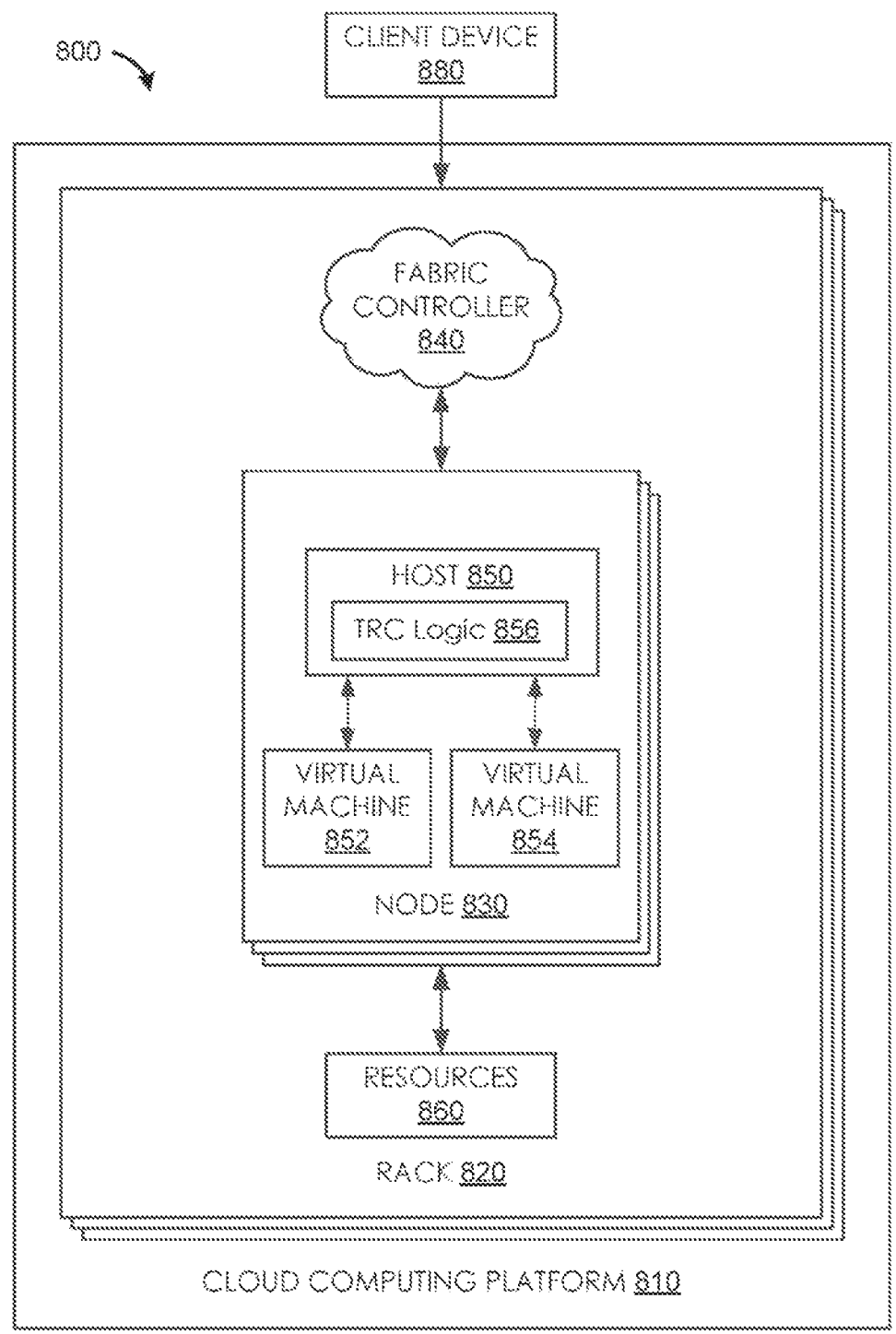
FIG. 8 is a block diagram of another exemplary computing environment suitable for use in implementing at least one aspect of the present disclosure.

Referring now to FIG. 8, FIG. 8 illustrates an exemplary distributed computing environment 800 in which implementations of the present disclosure may be employed. In particular, FIG. 8 shows a high-level architecture of a cloud computing platform 810, where the system supports computing on transient resources. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Data centers can support the distributed computing environment 800 that includes the cloud computing platform 810, rack 820, and node 830 (e.g., computing devices, processing units, or blades) in rack 820. The system can be implemented with a cloud computing platform 810 that runs cloud services across different data centers and geographic regions. The cloud computing platform 810 can implement a fabric controller 840 component for provisioning and managing resource allocation, deployment, upgrade, and management of cloud services. Typically, the cloud computing platform 810 acts to store data or run service applications in a distributed manner. The cloud computing infrastructure 810 in a data center can be configured to host and support operation of endpoints of a particular service application. The cloud computing platform 810 may be a public cloud, a private cloud, or a dedicated cloud.

Node 830 can be configured to perform specialized functionality (e.g., compute nodes or storage nodes) within the cloud computing platform 810. The node 830 is allocated to run one or more portions of a service application of a tenant. A tenant can refer to a customer utilizing resources of the cloud computing platform 810. Service application components of the cloud computing platform 810 that support a particular tenant can be referred to as a tenant infrastructure or tenancy. The terms "service application," "application," or "service" are used interchangeably herein and broadly refer to any software, or portions of software, that run on top of, or access storage and compute device locations within, a data center.

Node 830 can be provisioned with a host 850 (e.g., operating system or runtime environment) running a defined software stack on the node 830. In various embodiments, host 850 includes TRC logic 856. Similar to TRC logic 722 in FIG. 7, TRC logic 856 includes instructions that, when executed by one or more processors, result in node 830 performing various functions, such as, but not limited to, process 400, 500, or 600. In some embodiments, TRC logic 856 causes node 830 to perform various functions associated with, but not limited to, resource tracker 112 or resource dispatcher 114 in connection with FIG. 1. In some embodiments, TRC logic 856 causes node 830 to perform various functions associated with, but not limited to, task scheduler 212, checkpointing scheduler 214, task executor 232, or checkpoint manager 234 in connection with FIG. 2.

When more than one separate service application is being supported by node 830, the nodes may be partitioned into virtual machines (VM), such as virtual machine 852 and virtual machine 854. Each virtual machine can emulate a computer system with specialized hardware, software, or a combination thereof. Virtual machine 852 and virtual machine 854 may be implemented based on different computer architectures and provide various functionalities just as a physical computer. In various embodiments, transient computing resources (e.g., transient resources 122 of FIG. 1) include virtual machines, such as virtual machine 852 and virtual machine 854.

Physical machines can also concurrently run separate service applications. The virtual machines or physical machines can be configured as individualized computing environments that are supported by resources 860 (e.g., hardware resources and software resources) in the cloud computing platform 810. It is further contemplated that resources can be configured for specific service applications. Further, each service application may be divided into functional portions such that each functional portion can run on a separate virtual machine. In the cloud computing platform 810, multiple servers may be used to run service applications and perform data storage operations in a cluster. In particular, the servers may perform data operations independently but exposed as a single device referred to as a cluster. Each server in the cluster can be implemented as a node.

Client device 880 may be linked to a service application in the cloud computing platform 810. The client device 880 may be any type of computing device, such as a desktop computer, a laptop computer, a smartphone, etc. The client device 880 can be configured to issue commands to cloud computing platform 810. In embodiments, client device 880 may communicate with service applications through a virtual Internet Protocol (IP) and load balancer or other means that direct communication requests to designated endpoints in the cloud computing platform 810. The components of cloud computing platform 810 may communicate with each other over a network (not shown), which may include, without limitation, one or more local area networks (LANs) and/or wide area networks (WANs).

Having described various aspects of the distributed computing environment 800 and cloud computing platform 810, it is noted that any number of components may be employed to achieve the desired functionality within the scope of the present disclosure. Although the various components of FIG. 8 are shown with lines for the sake of clarity, in reality, delineating various components is not so clear, and metaphorically, the lines may more accurately be grey or fuzzy. Further, although some components of FIG. 8 are depicted as single components, the depictions are exemplary in nature and in number and are not to be construed as limiting for all implementations of the present disclosure.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however, the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the autonomous configuration system and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The foregoing description of one or more implementations provides illustration and description, but is not intended to be exhaustive or to limit the scope of the invention to the precise form disclosed. Modifications and variations are possible in light of the above teachings or may be acquired from practice of various implementations of the invention.

What is claimed is:

1. A computing system, the computing system comprising:
one or more hardware processors and computer storage media storing computer-executable instructions and components that, when executed, by the one or more hardware processors, cause the one or more hardware processors to perform operations comprising:
identifying an unutilized resource, the unutilized resource is configured as a transient resource having spare temporary computing capacity for use on a computing platform;
accessing an availability estimate associated with the unutilized resource, the availability estimate is a calculated estimated expected remaining time of how long the spare temporary computing capacity of the unutilized resource will remain available;
based on the availability estimate, determining a corresponding likelihood of completing each of a plurality of tasks on the unutilized resource while the resource remains available; and
in response to determining the corresponding likelihood of completing each of the plurality of tasks, prioritizing, using a task scheduler, execution of one or more tasks from the plurality of tasks based on the corresponding likelihood of completing each of the plurality of tasks on the unutilized resource while the unutilized resource remains available.

2. The computing system of claim 1, further comprising:
a task scheduler configured for:
accessing instability information associated with an estimation of availability of transient resources and information of a stage of a computational job, the stage having a plurality of parallel tasks; and
scheduling a task of the plurality of parallel tasks to use the transient resource based at least in part on a rate of data size reduction of the task; and a checkpointing scheduler, coupled to the task scheduler, configured for:
determining a checkpointing plan for the task based at least in part on a recomputation cost associated with the instability information of transient resources;
a task executor, coupled to the task scheduler, configured for:
receiving the task from the task scheduler; and
determining an output data block associated with the task; and
a checkpoint manager, coupled to the checkpointing scheduler and the task executor, configured for:
receiving the checkpointing plan from the checkpointing scheduler, wherein the checkpointing plan associates a first identification for the checkpointing plan with a second identification for the task and a third identification for the output data block; and
executing the checkpointing plan based on the first, the second, and the third identifications.

3. The computing system of claim 2, wherein the checkpoint manager is further configured for copying the output data block of the task to another transient resource that has a longer expected remaining time compared with the transient resource.

4. The computing system of claim 2, wherein the checkpoint manager is further configured for inserting the checkpointing plan into a data structure featured with an order of first-in-last-out; and sequentially executing a plurality of checkpointing plans based on the order of first-in-last-out.

5. The computing system of claim 4, wherein the checkpoint manager is further configured for communicating checkpointing status information of the plurality of checkpointing plans to the checkpointing scheduler, and wherein the checkpointing scheduler is further configured to adjust at least one checkpointing plan of the plurality of checkpointing plans based on the checkpointing status information.

6. The computing system of claim 2, wherein the task scheduler is further configured for determining the rate of data size reduction of the task based on an estimated execution time of the task, an input data size of the task, and an output data size of the task.

7. The computing system of claim 2, wherein the task scheduler is further configured for determining a rate of data size reduction of the stage based on respective rates of data size reduction of all tasks in the stage; and determining the stage has a maximum rate of data size reduction among a plurality of stages of the computational job.

8. The computing system of claim 2, wherein the task scheduler is further configured for determining a ratio of an expected execution time of the task and an expected lifetime of the transient resource is less than a predetermined threshold, and scheduling the task to use the transient resource is performed only when the ratio is less than the predetermined threshold.

9. The computing system of claim 2, wherein the checkpointing scheduler is further configured for determining the recomputation cost based at least in part on a first cost to recompute the task and a second cost to recompute one or more tasks associated with the task, wherein respective input data of the one or more tasks would become unavailable due to a failure of the transient resource.

10. The computing system of claim 2, wherein the checkpointing scheduler is further configured for determining the recomputation cost recursively with a predetermined recursion depth limitation.

11. The computing system of claim 1, wherein the checkpointing scheduler is further configured for determining a cost of backing up an output data block associated with the task based on a first cost of backing up the output data block when the transient resource fails before the backup is finished, a second cost of recomputing the task when the transient resource fails before the backup is finished, and a third cost of backing up the output data block when the transient resource fails after the backup is finished.

12. The computing system of claim 1, wherein the transient resource is a virtual machine in a virtual machine cluster.

13. A computer-implemented method for transient resource computing, the method comprising:
   identifying an unutilized resource, the unutilized resource is configured as a transient resource associated with a quantifiable spare temporary computing capacity for use on a computing platform;
   accessing an availability estimate associated with the unutilized resource, the availability estimate is a calculated estimated expected remaining time of how long the spare temporary computing capacity of the unutilized resource will remain available;
   based on the availability estimate, determining a corresponding likelihood of completing each of a plurality of tasks on the unutilized resource while the resource remains available; and
   in response to determining the corresponding likelihood of completing each of the plurality of tasks, prioritizing, using a task scheduler, execution of one or more tasks from the plurality of tasks based on the corresponding likelihood of completing each of the plurality of tasks on the unutilized resource while the unutilized resource remains available.

14. The method of claim 13, wherein the plurality of tasks are a plurality of parallel tasks that belong to a computing stage of a computing job, the method further comprising:
   determining a rate of data size reduction of the computing stage based on respective rates of data size reduction of the plurality of parallel tasks; and
   determining the computing stage has a maximum rate of data size reduction among a plurality of computing stages of the computing job.

15. The method of claim 13, further comprising:
   determining a ratio of an expected execution time of the task over an expected lifetime of the transient resource; and
   scheduling the task to use the transient resource only when the ratio is less than a predetermined threshold.

16. One or more non-transient computer storage media comprising computer-implemented instructions that, when used by one or more computing devices, cause the one or more computing devices to:
   identify an unutilized resource, the unutilized resource is configured as a transient resource having spare temporary computing capacity for use on a computing platform;
   access an availability estimate associated with the unutilized resource, the availability estimate is a calculated estimated expected remaining time of how long the spare temporary computing capacity of the unutilized resource will remain available;
   based on the availability estimate, determine a corresponding likelihood of completing each of a plurality of tasks on the unutilized resource while the resource remains available; and
   in response to determining the corresponding likelihood of completing each of the plurality of tasks, prioritize, using a task scheduler, execution of one or more tasks from the plurality of tasks based on the corresponding likelihood of completing each of the plurality of tasks on the unutilized resource while the unutilized resource remains available.

17. The one or more computer storage media of claim 16, wherein the instructions further cause the one or more computing devices to:
   access a task running on the transient resource and an output data block of the task;
   determine to checkpoint the task based on (a) a residual lifetime of the transient resource is shorter than a required remaining time to complete the task, and (b) a recomputation cost to recompute the task is greater than a backup cost to back up the output data block of the task,
   wherein calculating a recomputation for the task is based on computing a plurality of preceding tasks in a directed acyclic graph associated with the task, wherein the preceding tasks are limited by a predetermined recursion depth limitation based on the directed acyclic graph; and
   checkpoint the task.

18. The one or more computer storage media of claim 17, wherein the instructions further cause the one or more computing devices to:
   determine a cost of backing up the output data block of the task based on a first cost of backing up the output data block when the transient resource fails before the backup is finished, a second cost of recomputing the task when the transient resource fails before the backup is finished, and a third cost of backing up the data block when the transient resource fails after the backup is finished.

19. The one or more computer storage media of claim 17, wherein the instructions further cause the one or more computing devices to:
   determine, in response to a new computing event, a local backup cost to back up the output data block of the task to a local storage and a remote backup cost to back up the output data block of the task to a remote storage; and
   determine to back up the output data block to the local storage or the remote storage based at least in part on a first comparison between the recomputation cost and the local backup cost, and a second comparison between the recomputation cost and the remote backup cost.

20. The one or more computer storage media of claim 16, wherein the instructions further cause the one or more computing devices to:

build a checkpointing plan for the task, wherein the checkpointing plan comprises a first identification of the checkpointing plan, a second identification of the task, and a third identification of the output data block;

insert the checkpointing plan into a data structure featured with an order of first-in-last-out; and sequentially execute a plurality of checkpointing plans in the data structure based on the order of first-in-last-out.

\* \* \* \* \*